United States Patent

[11] 3,556,129

| [72] | Inventor | Richard J. Brown |
| | | 8758 Edgehill Road, Mentor, Ohio 44060 |
| [21] | Appl. No. | 634,244 |
| [22] | Filed | Apr. 27, 1967 |
| [45] | Patented | Jan. 19, 1971 |

[54] TWO-STAGE FLUID FUEL CONTROL VALVE
3 Claims, 8 Drawing Figs.

[52] U.S. Cl.......................................... 137/271,
137/341, 137/545, 137/549, 137/599
[51] Int. Cl........................................ F23n 1/00
[50] Field of Search......................... 137/599,
613, 270, 271, 549, 550, 341, 545

[56] References Cited
UNITED STATES PATENTS

| 2,602,468 | 7/1952 | Allen et al. | |
| 3,168,899 | 2/1965 | Mellett. | |
| 2,504,435 | 4/1950 | Matteson.................... | 137/599X |
| 2,704,085 | 3/1955 | Bieger et al................ | 137/341X |
| 2,909,638 | 10/1959 | Trabilcy...................... | 137/341 |
| 3,008,481 | 11/1961 | Matheson.................... | 137/270X |
| 3,046,406 | 7/1962 | Dietiker...................... | 137/599X |
| 3,115,154 | 12/1963 | Dillon........................ | 137/549X |
| 3,180,350 | 4/1965 | Rill, Jr., et al............. | 137/341X |

FOREIGN PATENTS

| 622,302 | 6/1961 | Canada................... | 137/613 |
| 1,071,127 | 8/1954 | France................... | 137/599 |

*Primary Examiner*—Robert G. Nilson
*Attorney*—George B. Kasik

ABSTRACT: This disclosure relates to a control valve for metering liquid fuel to a burner. It includes a pressure regulator that receives liquid at superatmospheric pressure and delivers it to a first solenoid-operated valve, and under certain conditions, also to a second and similar solenoid-operated valve. A filter and metering orifice assembly is located downstream from the first valve and meters the flow of fuel for a "low fire" stage of operation. Under said certain conditions, some of the liquid passing the first solenoid valve is channeled to the second solenoid valve and passes thence through a second and similar filter-orifice assembly (in parallel flow relationship to the first filter-orifice); this second stream may pass directly from the control valve to the burner or may be caused to join the liquid flowing from the "low fire" stage and flow in a single stream to the burner. Means are incorporated for easily removing, replacing and servicing the filter-orfice assemblies without disturbing other parts of the valve and for converting the valve from the single to the multiple outlet arrangement. Thermostatically controlled electrical heating means are also built into the valve.

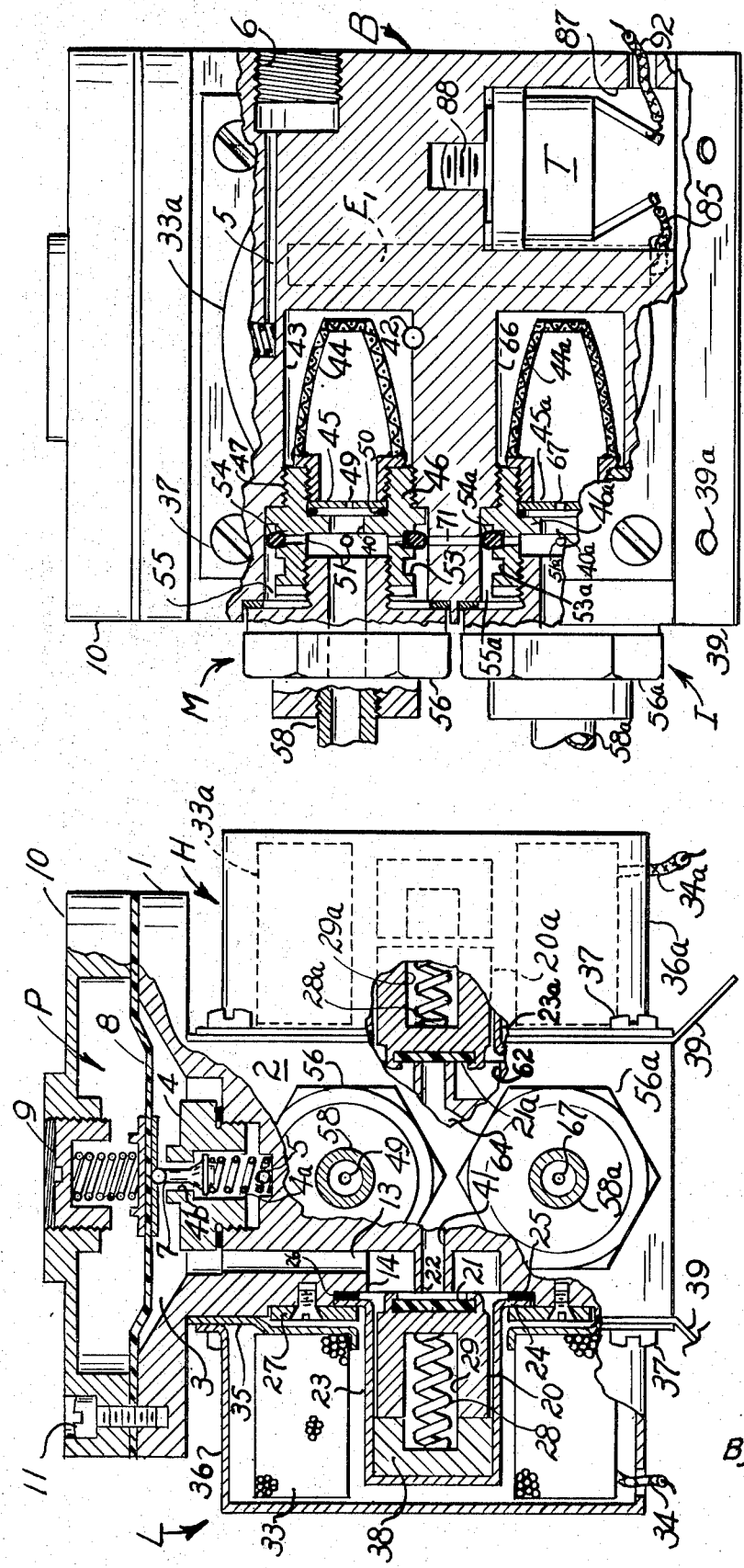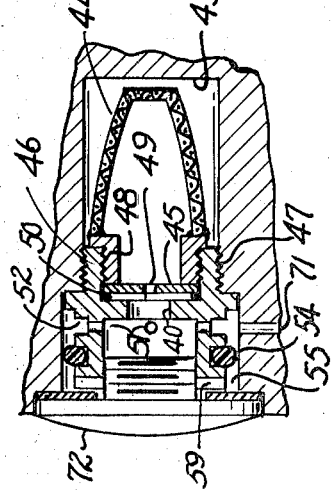

INVENTOR
RICHARD J. BROWN
By George B. Karik
ATTORNEY

INVENTOR
RICHARD J. BROWN
By George B. Karik
ATTORNEY

TWO-STAGE FLUID FUEL CONTROL VALVE

BACKGROUND OF THE INVENTION

The principal field of use of the device of my invention is in connection with liquid fuel burning apparatus, such as may be found on vehicles subjected to low ambient temperatures, wherein a heater is employed to maintain a safe condition for the motive power parts of the vehicle during periods of standby. In this heating equipment a burner is employed which generally operates at two different fuel burning rates: first, a "low fire" rate at which time a minimum amount of fuel is consumed, and secondly, a "high fire" rate during which period fuel is consumed at a considerably greater rate which may be as much as 10 times the low fire rate. In addition, the rated capacity—that is the heat output ability of the heaters—may vary according to the size of the installation and the heat requirements for the particular vehicle. For example, heaters on lighter equipment may have a rating of 15,000 B.t.u. per hour in contrast to the heating equipment for larger units wherein the rated capacity may be at the 60,000 B.t.u. per hour level. It will be seen, therefore, that a valve which will accommodate not only delivery rates for the high and low fire conditions, must also be adaptable for use on lighter as well as heavier equipment, and it is a principal purpose of my invention to provide a valve which will accommodate such wide range of delivery rates. The problem is further complicated by the fact that in order to properly meter fuel at the low rates that are sometimes encountered, a very small orifice opening is required so that the fuel fed to this type of orifice must be particularly free of obstructive material.

In addition, it should be noted that the ambient conditions under which this equipment is designed to operate are necessarily very adverse; thus, the equipment may operate at ambient temperatures as low as −60° F. At such low temperatures the fuel is difficult to handle primarily because of the possible precipitation of wax particles which interferes with the metering process. In addition, the equipment of this general type is generally located in remote geographical regions and the chance and probability of the introduction of foreign material into the fuel during transport and handling is considerable, so that means have to be devised to rid the fuel of these undesirable elements. Along the same line, in such remote regions the problem of servicing either in the field or at the outlying installations is acute. Thus, it is desirable to make the valve as simple as possible so that servicing problems are reduced to a minimum and also to make the valve as useful as possible over a wide range of required conditions so that a single valve can be modified as necessary or adapted as required to cover a wide range of requirements without the necessity of stocking a number of extra parts to make possible the conversion from one form to another.

A further limitation is sometimes imposed on the valves employed on certain of the above-described equipment. For example, with the smaller heaters, the burner generally has only one fuel inlet port, so that there need be only one connection or one fuel line running from the valve to the burner; the fuel is supplied to this line at the low fire rate, or alternatively at the high fire rate, depending upon the demand. However, with larger heating equipment, as for example the 60,000 B.t.u.-capacity units, it has been found necessary to deliver fuel to the burner at two different spaced points; in other words, when the burner calls for fuel at the low fire rate, fuel is admitted to the burner at the given point, then when there is a call for heat at the high fire rate, additional fuel has to be supplied to the burner at a second and different point so that effective vaporization and burning of the fuel is obtained. Under this latter condition, fuel must be supplied from the valve through two separate lines, one at a low fire rate and a second at a high fire rate. It will be found that the valve of this invention accomplishes that requirement by a simple adjustment to convert the valve to either a single outlet variety or to the double outlet form.

The prior art has addressed itself to the problems set forth above. In fact, applicant is the inventor of a Multiple Range Pressure Regulator disclosed in Letters Patent No. 2,764,996, dated Oct. 2, 1956. The device of this patent is adjustable by electromagnetic means to vary the characteristics, and thus the output, from a pressure regulator. It should be pointed out that the prior art has adopted the use of electromagnetic valve means to provide a parallel path for liquid flow from the output of a pressure regulator. However, none of the prior art devices have been completely satisfactory because they have failed to take into account (1) the necessity of a relatively large filter area for the orifices, (2) that the filter-orifice assembly shall be readily accessible without disturbing other parts of the valve, (3) that the valve shall be easily converted from a single to a multiple outlet form and (4) that the valve shall be provided with heating means to assure proper internal heating of the valve and the fluid passing therethrough.

SUMMARY

The valve of this invention is designed to receive fluid to be metered at superatmospheric pressure and by means of an internal pressure regulation means causes liquid at a predetermined lower and uniform pressure to be delivered to one or, alternatively, to two thin plate orifices which meter the fuel that is delivered from the valve; the valve contains, in addition, a novel filtration means and further means for electrically heating the liquid as it passes through the valve in order to assist in the metering operation. Furthermore, the valve is designed with means for permitting it to be converted from a single outlet valve to one having two outlet ports from which the liquid may be delivered at different rates of flow.

The principle of operation lies in utilization of a pressure regulator means which controls the pressure of liquid delivered to either or both of two thin plate orifices and also in controlling the path of flow of liquid downstream from said orifices so that the fluid is delivered from the device at either a single or double outlet and at different preselected flow rates.

Thus, it is an object of this invention to provide a valve that is capable of supplying fuel in accurately metered quantity at either of two preselected rates of fuel flow within a wide range of fuel flow rates. It is a further object of the invention to provide a valve that is adaptable to delivering the fuel to a burner through a single or a double outlet and wherein the rates of flow through the two outlets of the double outlet arrangement may be at different preselected rates. It is a further object of the invention to provide a valve of the above-described variety wherein thin-plate metering orifices are employed to accurately meter the fuel and wherein each orifice has associated therewith a liquid filtering means.

It is still a further object of the invention to provide a metering orifice-filter assembly which is readily removable as a unit for inspection, change, servicing or repair without disturbing any of the other parts of the valve. A further object of the invention is to provide a relatively large filter means associated with each of the metering orifices in order to assure: (1) a proper filtering of the fuel, (2) relatively large reservoir or basin for the accumulation of filtered-out solids (and thereby extend the life of the filtering element) and (3) a filter means which is readily serviceable and replaceable either in the field or on the bench.

Another object of this invention is to provide a valve in which the metering orifices may be readily serviced and either changed independently of the other to accommodate different ratios of high and low fire delivery rates. This has been achieved in a manner which permits access to the filter and metering orifices without disturbing other parts of the valve and thus has met a very critical requirement in the use of such equipment in the field.

It is an object of this invention to provide an adjustable means that is simple and convenient for varying the operating range of the pressure regulation device (and consequently changing the flow rates) of the valve.

It is a further object of the invention to provide a source of the internal heat to the valve body in order that the fluid fuel admitted to the valve may be brought to a proper working temperature to facilitate accurate metering and flow of the fuel through and from the valve.

Finally, it is an object of the invention to provide a control valve of the character described which is of lightweight construction, simple of operation, compact in design, but yet rugged and able to withstand the adverse conditions to which it is subject in use and handling. A prime objective is to have all the critical parts of the device enclosed within the valve body.

The foregoing objects are attained in the embodiment of the invention as illustrated in the accompanying drawings, and while I shall proceed to describe the invention so illustrated in detail, I wish it to be understood that I do not limit myself thereto further than is required by the terms of the appended claims.

BRIEF DESCRIPTION OF THE DRAWINGS

In the drawings, wherein like parts are designated by like reference characters throughout the several views:

FIG. 1 is a front elevational view partially in section illustrating the filter-orifice assemblies and the heating means and thermostatic control therefor; this FIG. illustrates the flow control device with two outlets;

FIG. 2 is a side elevational view, partially in section, illustrating details of the pressure regulation means and more particularly the solenoid-operated control valve mechanisms for the invention;

FIG. 3 is a fragmentary view in section through the filter-orifice assembly illustrating the condition of the said assembly (particularly with regard to the location of the O-ring element) when the device is employed with a single outlet;

DESCRIPTION OF THE PREFERRED EMBODIMENT

Figure 7:
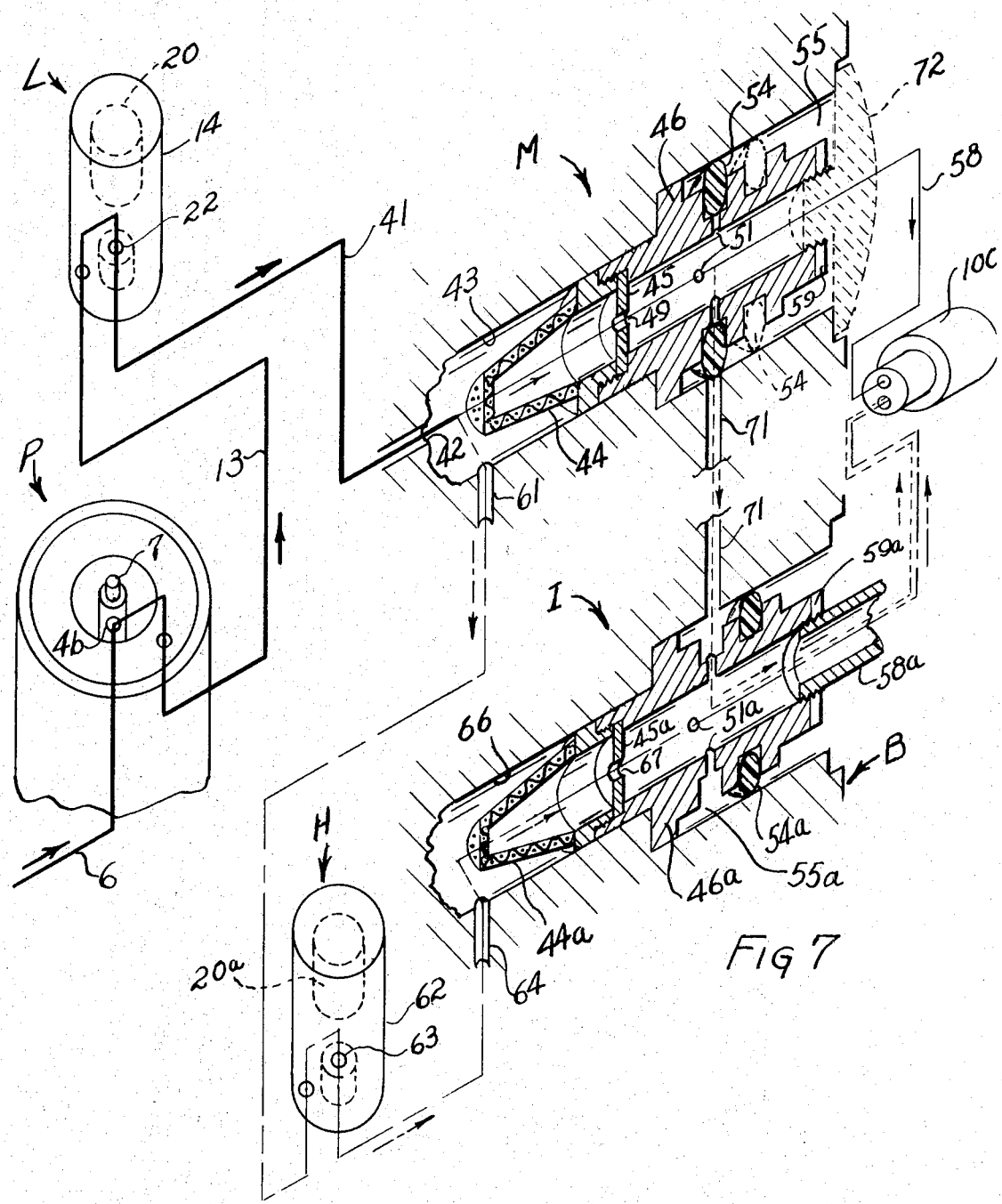
FIG. 7 is a schematic diagram illustrating the flow of fuel through the control device in its various stages of operation.
Figure 8:
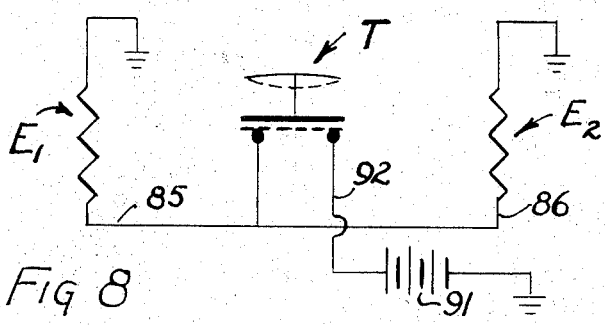
FIG. 8 is a diagrammatic representation of the thermostatic and electrical control system associated with the heaters for the valve of this invention.

I will now proceed to describe the construction of my invention, reference being had to the several figures. In general, the control device comprises a body B (see FIGS. 2 and 7) that is provided with a pressure regulation mechanism P from which liquid fuel is fed at constant pressure to first a solenoid control valve L which receives fuel at the regulated pressure and permits it to flow to filter-orifice assembly M designed to pass fuel at the low fire rate. Fuel passing through the solenoid valve L also passes to a second solenoid operated valve H which is designed to pass fuel to a second filter-orifice assembly I in response to a call for fuel at the high fire burning rate. The body B also is provided with a pair of heating elements designated $E_1$ and $E_2$, respectively, (FIGS. 1 and 8) that are designed to supply heat internally to the body B in proximity to the fuel passageways and the filter-orifice assemblies. These heating elements E1 and E2 are under the control of thermostat T set in body B and through which electrical energy is supplied to the heaters from a convenient power source. A schematic diagram of the wiring and control circuit is shown in FIG. 8.

Figure 4:
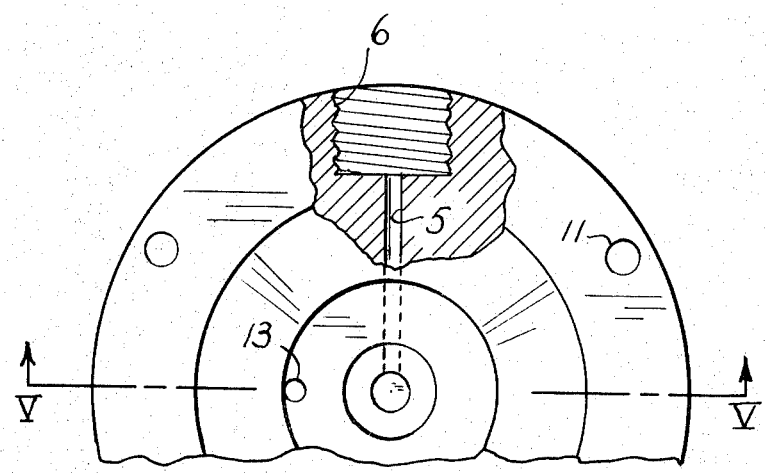
FIG. 4 is a plan view of the valve body to illustrate the passageway leading from the inlet to the pressure regulator chamber.
Figure 5:
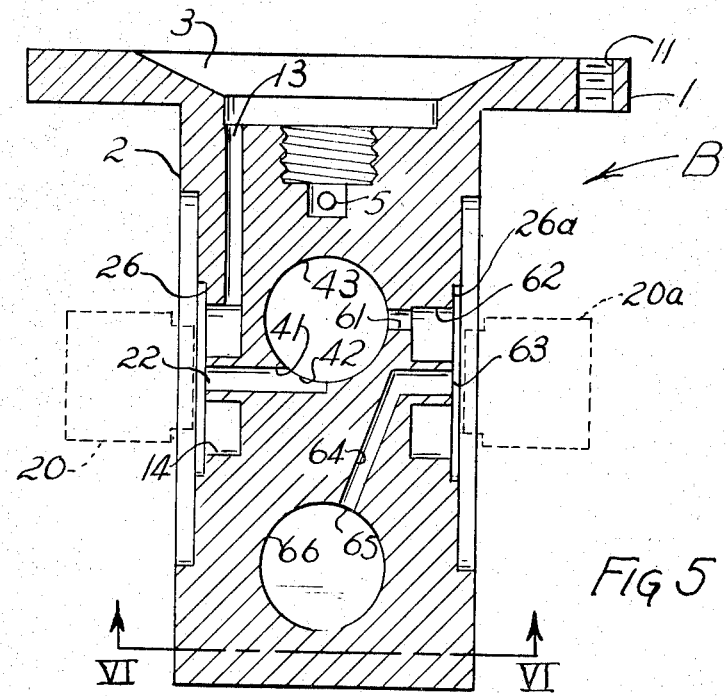
FIG. 5 is a vertical section along line V-V of FIG. 4 to illustrate certain of the liquid passageways through the body of the device.
Figure 6:
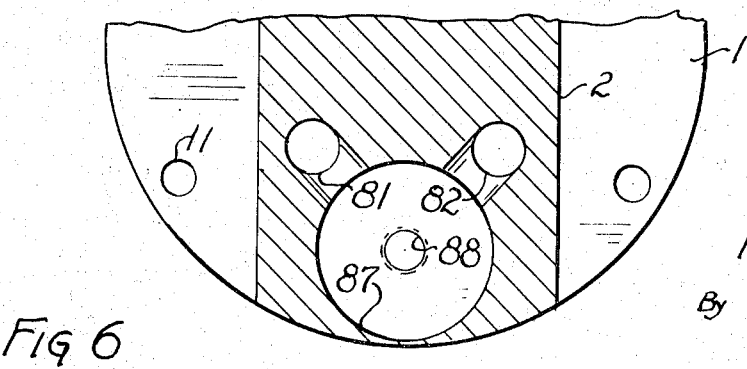
FIG. 6 is a horizontal section through the valve body along section line VI-VI of FIG. 5 to illustrate the placement of the thermostatic means and the associated heating elements within the body of the control valve.

Reference to FIGS. 1, 2, 5 and 7 will facilitate an understanding of the flow through the valve under various conditions. With reference to FIG. 5, it will be seen that the valve body B is comprised essentially of an upper head portion 1 and a main body portion 2. The body portion is drilled with a series of ports that permit the flow of fuel along the various paths indicated by the schematic diagram, FIG. 7. Essentially the head portion 1 and the upper part of the body portion 2 are formed to provide a pressure regulation chamber 3 adapted to receive a conventional liquid pressure regulation apparatus P. It includes a regulator valve body 4 that is screwed into the main valve body 2 in the lower part of the chamber 3. This regulator body 4 has a central bore 4a, the lower end of which is in communication with the port 5 at the end of a passageway that leads from the inlet 6 in the main valve body B. A regulator valve 7 operates in the central bore 4a under the influence of a diaphragm 8 which is conventionally spring loaded under an adjustable screw and spring arrangement 9 that is accessible from the top 10 of the pressure regulator assembly P. Screws 11 clamp the diaphragm 8 between the cover or top 10 to the body portion 1. The needle valve 7 is under the influence of the spring loading and the action of the diaphragm 8 and operates to control the flow of liquid from the source, past the valve 7 and out port 4b into the pressure regulated chamber 3. Main valve body 2 is provided with a passageway 13 that leads from the pressure regulated chamber 3 to a cavity 14 at the low fire valve L.

This solenoid-operated valve L is identical with that for the high fire control H and may be described as follows: (see FIG. 2) It comprises an armature 20 that has a plastic insert 21 adapted to cooperate with an outlet port 22 in cavity 14. Armature 20 is supported in a cup-shaped sleeve 23 having a flanged rim 24 that is mounted against a gasket 25 in a recess 26 in the body 2. The sleeve is held in place against the body by a pole plate 27 which is screwed to the body. A coil spring 28 is received in a recess 29 in the rear of the armature 20; its other end is held in a similar recess in the thickened pole disc 38 in the end of sleeve 23. The spring 28 urges the armature 20 against the port 22 to close the same (a condition shown in the high fire valve H of FIG. 2). Surrounding the sleeve 23 is a coil 33 that receives energy through an electrical conductor 34. This coil 33 is positioned in operative relation to the armature 20 and the sleeve 23 by a retainer plate 35 and an associated cover 36 which are bolted to the main valve body 2 by means of screws 37; this retainer plate may have an extension 39 provided with appropriate screw holes 39a for mounting the valve to its place of installation. The armature 20 is adapted to be drawn away from the port 22 when the coil 33 is energized (a condition shown in the low fire valve L of FIG. 2). The pole piece 27 and the heavy thickness of magnetic material of disc 38 in the end of the sleeve 23 are employed to define and concentrate the path of electromagnetic flux and thereby improve the operating efficiency of the electromagnetic coil 33. The plastic seat or insert element 21 is held on the end of the armature in any well-known method. The coil 33 is connected onto a control circuit (not shown) for the heating apparatus and is energized with electrical energy from the vehicle electrical power supply.

Leading from the low fire outlet port 22 is a passageway 41 that terminates at 42 in the wall of a filter cavity 43 (FIG. 5). Within this cavity 43 is supported a filter element 44 and a low fire metering orifice plate 45, with an orifice opening 49, by means of a retainer 46 (FIG. 1). This orifice opening 49 is designed to pass that amount of fuel necessary to provide low fire operation of the burner 100 with which the control device of this invention is associated. This retainer is in the form of a cylindrical sleeve with a central bore 40 and is threaded at its forward end to be received in fluidtight relation with a correspondingly threaded portion 47 of the filter cavity 43 (FIG. 3). The filter element 44 is threadedly supported at 48 by the retainer 46 within the filter chamber 43 upstream from the orifice plate 45. Although the retainer 46 is described above as being threaded to the body 2, alternatively, it may be supported therein by a tapered bore at 47 and held in place by spring loading against its back edge in any conventional manner; the point being that there should be a seal between the sleeve 46 and the wall of the filter cavity 43 so that any liquid passing through the sleeve 46 shall first have to pass through the filter element 44 and the low fire orifice 49. As shown in FIG. 1, the orifice plate 45 is removably held in position against a shoulder at the internal bore 40 by the downstream end of the filter element 44. A ring seal 50 may be positioned behind the orifice plate 45 to prevent seepage around that plate. It will be observed that there is a relatively large filter area for liquid passing to the orifice 49; furthermore, the cavity 43 provides a large reservoir surrounding the filter for accumulation of sediment and other undesirable material separated from the liquid stream.

It will be observed that access to the filter element 44 and its associated orifice plate 45 is readily accomplished since it merely requires disconnecting the outlet line 58 (described below) and removing the orifice retainer 46 with its associated parts. Thus, in the event a filter should become clogged the same can be easily cleaned or replaced; likewise, a change in the metering orifice 49 can easily be handled by removing the retainer 46 without disturbing other parts of the valve. This is an important feature and distinguishes my construction from that of the art heretofore employed.

Downstream from the orifice plate 45 the peripheral wall of the retainer sleeve 46 is pierced with a series of circumferentially spaced, radially directed openings 51. Further, the outer peripheral wall of the retainer 46 in the plane of the aforesaid openings 51 is provided with a groove 52, and a second, similar groove 53 is cut in said wall toward the end of the retainer remote from the filter element 44. These grooves 52 and 53 are of such size as to receive an annular seal in the form of an O-ring 54. When the O-ring is in the groove 52 (as shown in FIG. 1) and the retainer 46 is assembled in the valve body 2, the O-ring 54 seals the ends of the openings 51 and the metered liquid fuel passes out through bore 40 to the end of the retainer 46 and into line 58, whence it is conducted to the burner of the heater 100. It will be noted that there is a slight clearance between the peripheral wall of the retainer 46 in the region of the openings 51 and the main body of the valve 2; this provides a space 55 for purpose that will appear. The outer peripheral area of the O-ring 54 bears against the wall of space 55 to form a seal therewith. To facilitate removal of retainer 46, a slot 59 is cut in the outer end face to accommodate a screwdriver or other like implement.

The above description has illustrated those parts of the valve which come into play when there has been a call for low fire flow of fuel to the burner of heater 100. It is my purpose next to explain the flow of fuel when conditions are such that the heater requires a flow of fuel at the high fire rate. Under these circumstances, fuel will continue to be metered at the low fire rate and pass into central bore 40 as previously described, but in addition, a supplemental flow of fuel will be added to produce a total fuel flow at high fire rate. Under these latter conditions, the high fire, solenoid-operated valve H will open to permit the supplemental flow of fuel through a path now to be described.

With reference to FIG. 5, it will be seen that a fuel passageway 61 leads from the low fire filter chamber 43 to the high fire valve cavity 62. Flow of fuel from cavity 62 is under the control of the high fire solenoid valve H, see FIG. 2. This valve is identical in construction and operation to that previously described for the low fire solenoid control valve L; all parts of the high fire valve H bear reference characters corresponding to the respective part number of the low fire valve but distinguished by the added reference character a. Thus, the armature 20a with its plastic valve closer 21a serves the same purpose as the corresponding parts 20 and 21 of the low fire valve L; under the action of spring 28a, armature 20a tends to close the port 63 leading from the high fire valve cavity 62. When the high fire solenoid coil 33a is energized, the armature 20a withdraws from the port 63 opening the same and allows fuel to flow from the cavity 62 through passageway 64 to a port 65 in the high fire filter cavity 66. This cavity contains the same arrangement of parts including filter 44a, orifice plate 45a, retainer 46a and seal 50a that the low fire cavity contains and for that reason the respective parts in the high fire filter assembly (excepting the metering orifice opening) are indicated by the same reference characters distinguished only by the addition of the character a. The only difference between the two assemblies lies in the size of the orifice opening; in the low fire assembly, orifice 49 is relative small size to meter only that fuel flow required for low fire; in the high fire assembly, the corresponding orifice 67 is generally of larger diameter to pass the necessary additional fuel required for high fire operation. In many installations, these orifice sizes may be exactly the same. It will be noted that the filter cavities 42 and 66 are both pressurized to a given preselected pressure determined by the setting of the regulator P, but that the liquid on the downstream side of orifices 49 and 67 respectively is not pressurized so that the fuel is adapted to flow at barometric pressure to the burner.

With reference to FIG. 1, it will be seen that in the low fire assembly M the O-ring 54 is shown seated in the slot 52 to close the openings 51. Thus, the fuel flows through this assembly and out the adapted 56 into the pipe 58 to the burner of heater 100. In the same fashion, when the high fire solenoid valve H is open, the liquid reaching chamber 66 passes through the filter 44a and orifice 67, bore 40a and out into the adapter 56a to pipe 58a and thence to the high fire section of the burner for heater 100. This arrangement is known as a double outlet configuration for the control device of my invention and is illustrated in FIG. 1 arrangement. There are instances, however, when it is desirable to have only one outlet from the device and to pass the liquid fuel for both the low fire and high fire stage through that outlet. In this circumstance, it is necessary to transfer the liquid passing through the low fire orifice 49 down into the high fire outlet 58a and this is readily accomplished in my invention as follows: A passageway 71 is provided between the space 55 and the corresponding space 55a. In addition the O-ring seal 54 is positioned in groove 53 to expose the ends of openings 51 to the space 55, FIG. 3. In the same fashion, the O-ring 54a is moved into groove 53a so that openings 51a are effectively put into communication with the openings 51 through the agency of the opening 71 and spaces 55a and 55 respectively. Under these circumstances the outlet adapter 56 and pipe 58 is removed and a plug 72 substituted to close the outlet for the low fire retainer 46 (FIG. 3) thereby making it necessary for all liquid passing through orifice 49 to eventually travel to the outlet line 58a.

This invention is adapted for use with fuels of a wide range of viscosities and of various specifications ranging from diesel oil (which is a relatively heavy liquid fuel) to the lightweight hydrocarbon fuels. At the very low temperatures (as low as −65° F.) at which the fuel may be supplied to the liquid valve of this invention, the certain of the fuels tend to deposit a waxy precipitate (cloud point) that would interfere with the proper metering of the fuel. Although the present metering system employed in this valve in the form of a thin plate orifice is designed to properly meter the liquid over a wide range of viscosities (and, therefore, temperatures) it has been found that at the very low temperatures, for example below −50° F., the wax precipitation tends to interfere with metering of the heavier fuels. Accordingly, my invention incorporates a heating system in the form of heater elements E1 and E2 set in openings 81 and 82 respectively that are drilled through the bottom of the valve body 2 upwards into proximity with the ends of the filter cavities 42 and 66. These elements are held in place by appropriate setscrews threaded into openings in the body 2. These electrical resistance elements transmit heat directly to the body of the valve, which is preferably of a heat conductive material such as aluminum alloy or the like, and that heat raises the temperature of the incoming fuel as it passes through the valve body 2. This facilitates the operation of the pressure regulator P and affects proper metering of the fuel at the orifices 40 and 67. A thermostatically controlled switch T which is directly responsive to the temperature of the valve body 2 is set in a recess 87 and held there by means of screw 88. Current is provided from a convenient power source 91 through conductor 92 to the thermostatic control T and thence passes to the heater elements through conductors 85 and 86, as illustrated schematically in FIG. 8.

The operation of my two-stage control valve is as follows, reference being made to the flow diagram of FIG. 7: Fuel to be metered is supplied from a fuel supply through a conventional pump at a pressure generally in excess of 5 p.s.i. and is fed to the inlet 6 of the pressure regulator P. The pressure is regulated at this pressure regulator by appropriate adjustment of the spring loading on the diaphragm 8 by means of screw 9. Ordinarily, the regulated pressure will vary from one-half to 4 pounds depending upon the size of the burner with which the fuel control device is operating. For example, with a 30,000 B.t.u. burner a regulated pressure of 1 to 2 p.s.i. is found as desirable; for a larger burner of the 60,000 B.t.u. capacity a regulated pressure may run as high as 2 to 3 p.s.i. or higher depending upon the type of fuel. For the lighter fuels with smaller burners (for example, a 15,000 B.t.u. capacity with kerosene as a fuel) the regulated pressure may be as low as one-quarter to one-half pound. In any event, the setting of the pressure regulator is determined in general by the ambient conditions, the nature of the fuel, and the character and size of the burner. Fuel passes from the pressure regulator P out port 4b to line 13 where it enters the low fire cavity 14. If there is a call for heat an appropriate thermostat at the heater or other place in the external system actuates the low fire solenoid 33 to open that valve and permits the fuel to flow into port 22 thence to line 41 and on into the low fire filter cavity 43 at port 42. Part of the fuel passes through the filter 44, the low fire orifice 49 and thence into the low fire filter retainer 46. If the control valve is arranged for output through two lines, (as shown in FIG. 1) wherein the low fire output is separate from the high fire output, the O-ring 54 will be in place over the openings 51 in retainer 46 and the fuel will pass on out through the fuel line 58 to the burner. On the other hand if the fuel control valve is fitted only with the single outlet, the O-ring 54 will then have been moved to groove 53 and the fuel will pass from adapter 46 through openings 51 into space 55, through passageway 71, into openings 51a and thence out the high fire outlet 58a to the burner. When there is a call for fuel at the low fire rate only, the high fire solenoid valve H is not energized and consequently armature 22a is held in a closed position on outlet 63 so that any fuel reaching the high fire solenoid valve cavity 62 does not pass on out to the burner.

When the burner calls for fuel at the high fire rate, the high fire solenoid valve H is actuated, (while the low fire coil 33 remains energized) coil 33a is energized to retract the armature 20a and open the port 63 to allow fuel to flow through passageway 64 into the high fire filter cavity 66. From here the fuel flows on through the high fire filter 44a, thence through the high fire orifice opening 67 and through bore 40a of retainer 46a to outlet line 58a. In the event that the valve of this invention is arranged with a single outlet, the fuel from the high fire filter-orifice assembly joins that from the low fire side to pass out to the burner in a single stream. When there are separate outlets, however, the fuel from the high fire stage is directed to the burner through a separate line 58a from that of the low fire stage.

Whereas the preceeding description has illustrated a single outlet arrangement whereby the low fire fuel flow leaves the device through the high fire retainer assembly and line 58a, it is also possible to provide a single outlet arrangement whereby all fuel leaves the device through line 58; this is accomplished merely by plugging the end of the high fire retainer 46a, moving both O-rings, 54 and 54a, to the position shown in FIG. 3 and attaching the outlet 58 to 56. In this arrangement, liquid from the high fire assembly flows up passage 71 to join the low fire stream.

During the above process, heat is supplied to the main valve body by means of the heater elements E1 and E2 under the control of the thermostat T, to assure that the incoming fuel is at a proper temperature range to permit accurate control of the flow or metering of the fuel.

It will be seen that the two-stage flow control device of my invention has the advantage of simplicity of operation plus the further advantage that there are many common parts in its construction. Furthermore, the valve is easily capable of conversion from a single outlet to a double outlet operation without the necessity of special additional parts or complicated change of the settings within the device.

It will also be observed that each of the orifices is provided with its separate filtering means of relatively large area which assures adequate filtering for the intended purpose.

In addition, a change in the rate of flow from the valve is easily accomplished by mere adjustment of the pressure regulator adjustment screw. If the ratio between high and low fire is to be varied, then it is a simple matter to change the respective orifice plates 45 and 45a and substitute others with the appropriate sized orifice openings. Furthermore, in the event the filters become clogged, the same may be readily removed without disturbing other parts of the system to any extent and a replacement inserted or the faulty filter cleaned.

It is particularly important to note that all the above changes and adjustments are readily made either on the bench or in the field since all the parts are readily accessible. It is believed that the most important features of this new valve are that it is capable of being adjusted to cover a very wide range of flow rates, that it is easily serviced under even the most adverse conditions because all adjustable parts are readily accessible, that the parts requiring attention are built in subassemblies which are easily removable and readily convertible from one condition to another and that a maximum of standardization has been achieved.

I claim:

1. An improved two-stage flow control device having a main body and containing a pressure regulator which delivers liquid at a uniform pressure to a first control valve from which the liquid is fed along one path to a first filter and metering means, and from which first valve under certain conditions liquid is fed along a second path to a second similar filter and metering means, the flow through the second path being under the further control of a second control valve and the device having an inlet in communication with the pressure regulator, wherein the improvement lies in providing within the body a filter cavity in each of the above paths downstream from the respective control valves and a retainer removably mounted in each cavity, individually accessible from the exterior of the device and supporting one of the said filter and metering means, and wherein each retainer has a main passageway leading to an outlet for all liquid passing through its associated metering means.

2. A device as described in claim 1 wherein the body has a cross passageway near the outlet and the retainers have cross openings in their downstream portions in communication with said cross passageway, normally closed, selectively openable means in said cross openings whereby the metered streams may be joined, and plug means for the downstream end of the main passageway of one of the retainers whereby all metered liquid leaves the device through the outlet end of the other of the retainers.

3. A device as described in claim 1 wherein the body has a cross passageway near the outlet and the retainers have cross openings in their downstream portions in communication with said cross passageway, normally closed, selectively openable means in said cross openings whereby the metered streams may be joined, and separate outlets from each main passageway and its associated metering means whereby when the selectively openable means are closed on their respective cross openings the liquid from each retainer is delivered in a separate stream from the device.